United States Patent
Alimpich et al.

[19]
[11] Patent Number: 6,151,024
[45] Date of Patent: Nov. 21, 2000

[54] DATA PROCESSOR CONTROLLED DISPLAY INTERFACE WITH TREE HIERARCHY OF ELEMENTS VIEW EXPANDABLE INTO MULTIPLE DETAILED VIEWS

[75] Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of Colo.

[73] Assignee: International Business Machines Corporation, Armonk, N.Y.

[21] Appl. No.: 09/053,209

[22] Filed: Mar. 31, 1998

[51] Int. Cl.⁷ .................................................... G06F 3/14
[52] U.S. Cl. .......................................... 345/357; 345/356
[58] Field of Search ................................ 345/357, 356, 345/353; 707/527; 395/114, 115, 116

[56] References Cited

U.S. PATENT DOCUMENTS

| | | | |
|---|---|---|---|
| 5,566,278 | 10/1996 | Patel et al. | 395/114 |
| 5,714,971 | 2/1998 | Shalit et al. | 345/119 |
| 5,742,778 | 4/1998 | Hao et al. | 395/332 |
| 5,774,120 | 6/1998 | Goddard et al. | 345/348 |
| 5,838,319 | 11/1998 | Guzak et al. | 345/340 |
| 5,917,492 | 6/1999 | Bereiter et al. | 345/357 |

*Primary Examiner*—Raymond J. Bayerl
*Assistant Examiner*—David E. Brown
*Attorney, Agent, or Firm*—Julius B. Kraft; David W. Victor; Konrad Raynes & Victor LLP

[57] ABSTRACT

A data processing controlled display system for the interactive display and control of a hierarchical tree of elements or objects which are selectable to display detailed views of the attributes of the child objects of the selected parent object. The invention is directed to parent objects of which the child objects are different object types. Upon the selection of such a parent object, its child objects are displayed in a plurality of separate screen regions, each respectively displaying the attributes of one of said different types of child objects. The different types of child objects may come from different levels in the hierarchy. The invention is also applicable to the hierarchical trees used in object oriented programming and particularly to situations in object oriented programming where the selected parent object is of a container class.

22 Claims, 5 Drawing Sheets

DATA PROCESSOR CONTROLLED DISPLAY INTERFACE WITH TREE HIERARCHY OF ELEMENTS VIEW EXPANDABLE INTO MULTIPLE DETAILED VIEWS

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", U.S. Ser. No. 09/053,210; "Data Processor Controlled Display System With a Plurality of Switchable Customized Basic Function Interfaces for the Control of Varying Types of Operations", U.S. Ser. No. 09/053,214; "Data Processor Controlled Display System for the Control of Operations With Control Properties Which are Selectably Constant or Variable", U.S. Ser. No. 09/053,207; "Data Processor Controlled Interface with Multiple Tree of Elements Views Expandable into Individual Detail Views", U.S. Ser. No. 09/052,858; "Data Processor Controlled Display With a Tree of Items With Modification of Child Item Properties Designated at Parent Level Without Modification of Parent Item Properties", U.S. Ser. No. 09/053,211; and "Data Processor Controlled Display System With a Tree Hierarchy of Elements View Having Virtual Nodes", U.S. Ser. No. 09/053,213; all are assigned to International Business Machines Corporation by Claudia Alimpich et al. and all are filed concurrently herewith.

TECHNICAL FIELD

The present invention relates to user interactive computer supported display technology and particularly to such user interactive systems and methods which are user friendly, i.e. provide users with an interface which is easy to use and intuitive.

BACKGROUND OF THE INVENTION

The computer and computer related industries have benefitted from a rapidly increasing availability of data processing functions. Along with this benefit comes the problem of how to present the great number and variety of available functions to the interactive operator or user in display interfaces which are relatively easy to use. In recent years, the hierarchical tree has been a widely used expedient for helping the user to keep track of and organize the operative and available functions. In typical tree structures, such as those in Microsoft Windows 95™ and IBM Lotus™ systems, there is presented on the display screen, a variety of available functions and resources in tree hierarchies with classes and subclasses of functions and resources displayed as elements or objects at nodes or junctions in the tree in a descending and widening order based upon some kind of derivation from the next higher class or subclass. In conventional tree displays, it is customary to show the tree on one region of the screen and to permit the user to interactively select any object on the screen for an expanded view, i.e. a detail view showing attributes or properties of the child objects of the selected object. Such child objects may be said to be derived or comprehended by the selected or parent object. This detail view is customarily displayed in a second region of the screen which is separate from the tree view. In relatively simple tree structures where all of the child objects are of the same type or subclass, the customary interface is sufficient. The attributes of the subclass may be listed as headings and the attribute values of each child object may be set forth under the respective headings. For example, if the parent object in a tree is a folder and all of the child objects are files in the parent folder, then all of the child objects are of the same type and the common attributes of such files may be listed in the separate detail region of the display screen.

However with the great increase of functions available in computers, it is not unusual for display trees to contain at least some objects which have child objects of different types. For example, a queue object may contain both printers and print jobs waiting for allocation to printers; or an object representing a priority function may have files and folders at the same priority level. In such situations where the child objects are of mixed types or subclasses, the customary expanded views of child objects in a detail view region of the screen become relatively inappropriate and cumbersome. Setting forth attributes of such a "mixed bag" of child objects tends to confuse the interactive user at best.

It should also be noted that the tree hierarchical structure is one of the primary organizational expedients in the object oriented programming processes which have become more prevalent over the past decade. In object oriented programming systems, there are many implementations in which there are hierarchies of child objects in subclasses of parent object classes wherein the child objects inherit at least some attributes of the parent objects. The present invention may be advantageously used with such tree hierarchies. Parent objects which contain child objects of different types are referred to as container objects. Setting forth the attributes of such container classes of objects of mixed types also tend to confuse interactive users.

Before proceeding with the description of the invention, it is important that we clarify the terminology used in describing the present invention with respect to terminology used in the art. The typical tree structure used in interactive displays has a plurality of levels of nodes at which elements are displayed. Such elements may be in text or icon form. The elements each represent a function or resource of the system or program which is to be interactively accessed through the displayed tree. It is customary to refer to these displayed elements as objects so as to conveniently use the terms child objects or parent objects in describing various hierarchical relationships between objects. It should be understood that in object oriented programming, the term object is, of course, extensively used to represent the basic program units. Thus, it may sometimes be the case that the object in a displayed tree does represent an object in an object oriented program. However, since trees of displayed objects are used to interface with many systems not involving object oriented programming, the use of the word object is not intended to limit the description or claim to object oriented applications. The terms object and elements as used in the claims should be considered as substantially equivalent.

SUMMARY OF THE INVENTION

The present invention provides a solution to the problem of presenting elements or objects of mixed types by separating the objects in the detail view according to their respective subclasses or types. Such details view organization could be very effectively used in object oriented programming processes, particularly in the details view of container class objects.

The present invention relates to a data processor controlled display system providing an ease of use interface based upon a tree view of selectable elements or objects arranged in a hierarchy located in one region of the display screen. One or more of the objects in the tree are parent objects, each of which have child objects of different types. The invention involves means responsive to the selection of an object having child objects of different types for displaying attributes of said child objects in a plurality of separate screen regions, each respectively containing the attributes of one of said different types of objects. The attributes of such different child objects will of course be different and, thus, displayed differently in their respective separate screen regions. Where a parent object has different child objects, such child objects may be from different hierarchial levels. On the other hand, they may be in subclasses of the parent class which inherit most of their attributes from the parent but still differ in one or more additional attributes. As mentioned hereinabove, the interfaces of the present invention may be used in object oriented programming, in which case the parent object may be of a container class "containing" objects of different subclasses or types.

As will be seen hereinafter in greater detail, the present invention may be advantageously used in the control of production operations such as high throughput printing operations.

DETAILED DESCRIPTION OF THE PREFERRED EMBODIMENT

Figure 1:
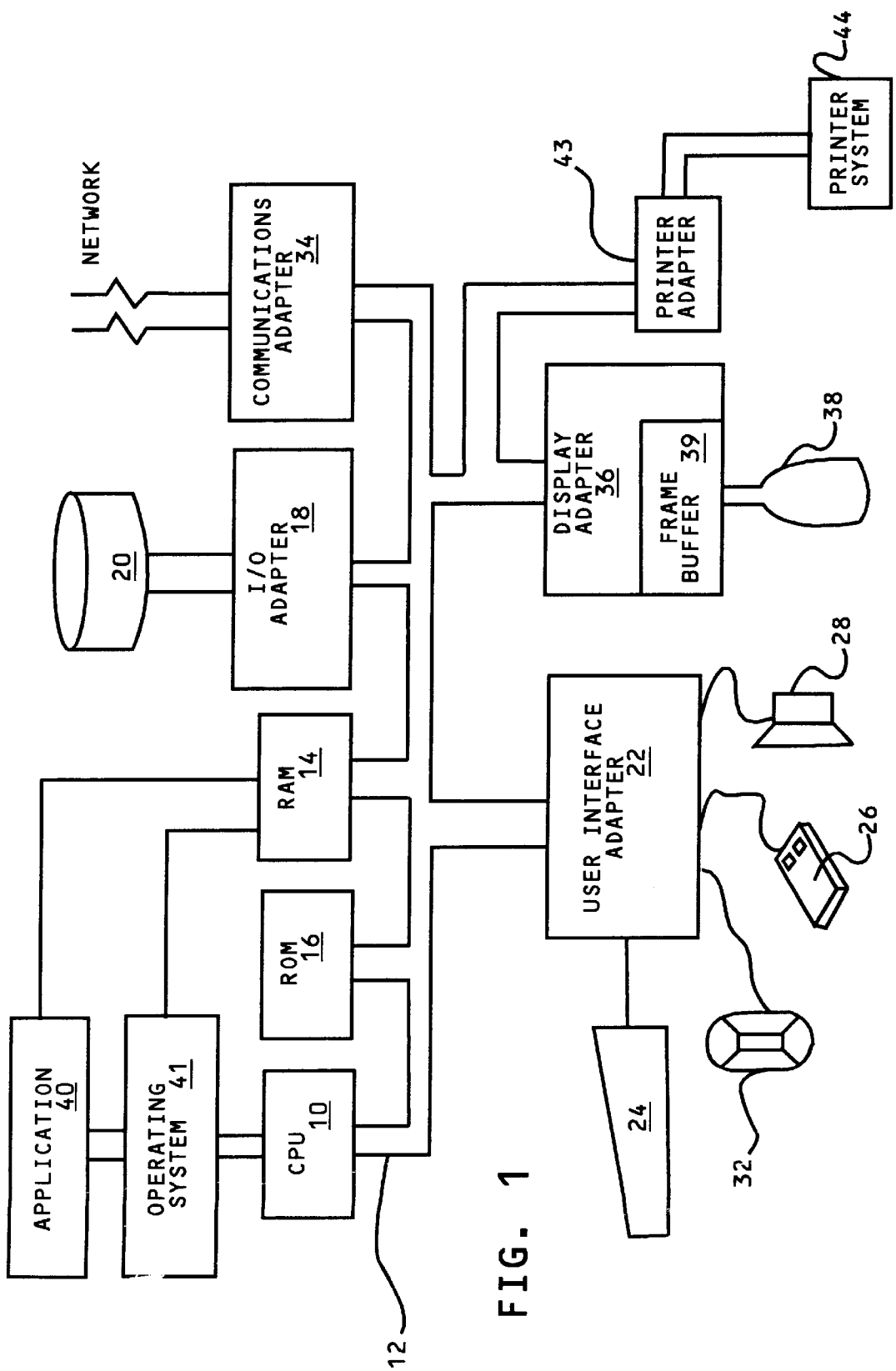
FIG. 1 is a block diagram of an interactive data processor controlled display system including a central processing unit which is capable of implementing the program of the present invention for presenting object tree views and the detail views with child objects of different types in different screen regions.

Referring to FIG. 1, a typical data processing system is shown which may function as the computer controlled display terminal used in implementing the tree view and details view functions of the present invention. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation); Microsoft Windows 95™ or Windows NT™, as well as Unix and AIX operating systems. A programming application for displaying hierarchical tree views and for presenting details views in accordance with the present invention, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems of which objects may also be displayed in the object tree interfaces of the present invention. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the illustrative embodiment, which will be subsequently described, the hierarchical tree of objects and the subsequent separated details views of different child objects will be shown with respect to the control of high throughput printers such as electrophotographic or laser printers. A local printer system 44 may be accessed and controlled via printer adapter 43 while, as previously mentioned, networked printers may communicate via communications adapter 34.

There will now be described a simple illustration of the present invention with respect to the display screens of FIGS. 2 and 3. When the screen images are described, it will be understood that these may be rendered by storing an image and text creation programs, such as those in any conventional window operating system in the RAM 14 of the system of FIG. 1. The operating system is diagrammatically shown in FIG. 1 as operating system 41. An embodiment of the present invention will be described commencing with the display screen shown in FIG. 2. This initial display screen is presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 2:
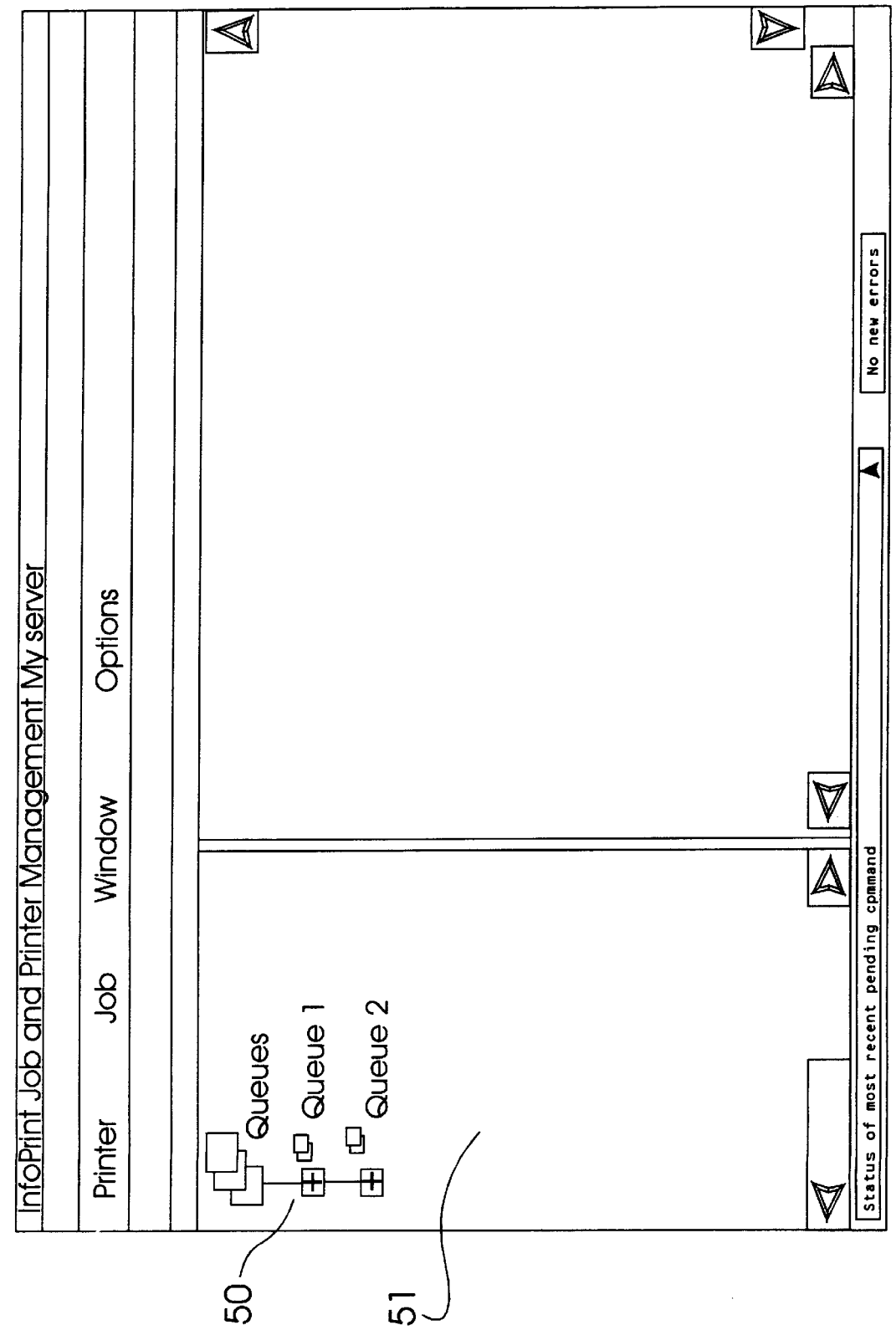
FIG. 2 is a diagrammatic view of a portion of a display screen on which a portion of a hierarchical object tree of queue objects is shown prior to any user selection.
Figure 3:
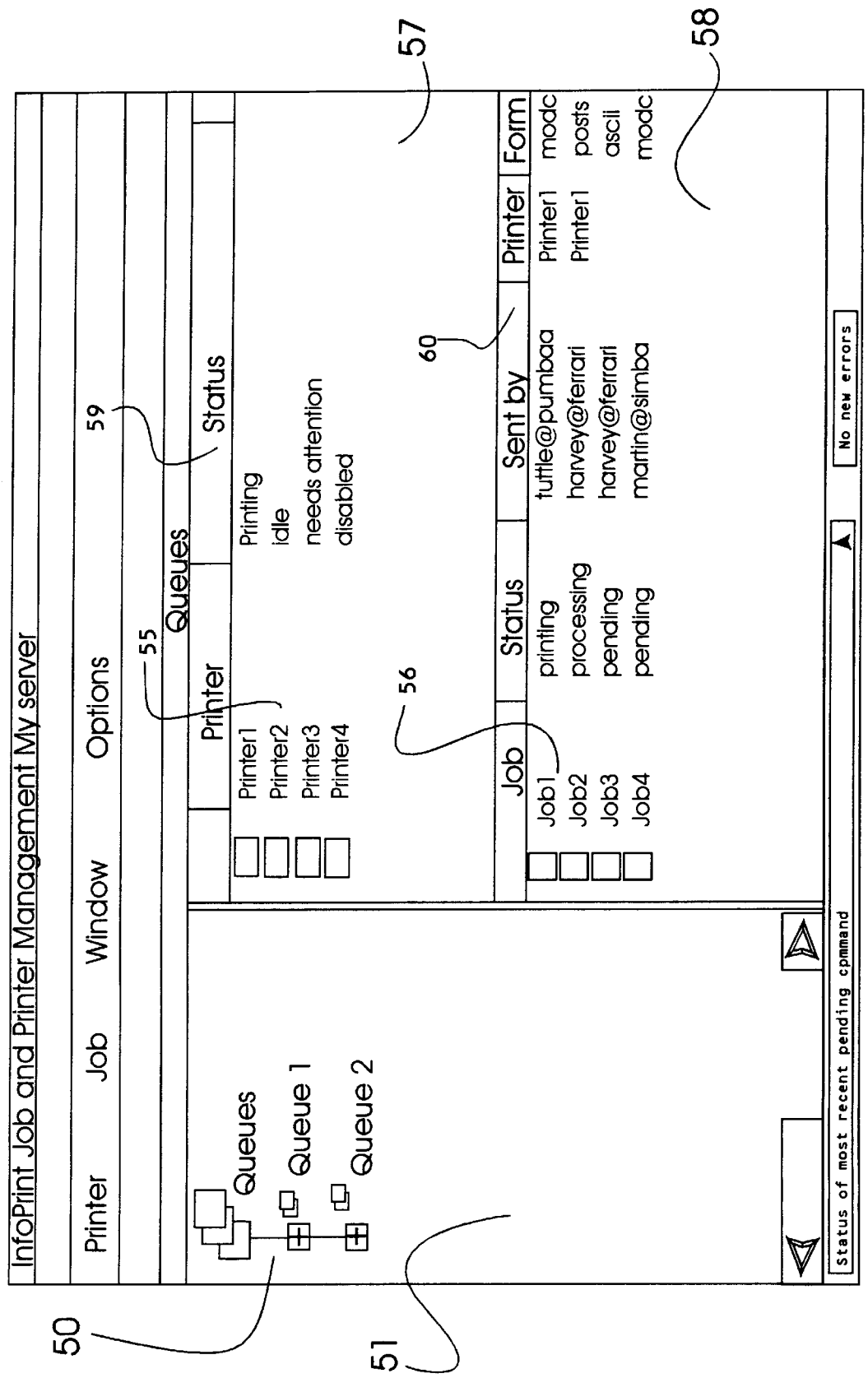
FIG. 3 is the view of the display screen of FIG. 2 showing the details view resulting from the selection of a parent object.

The display screen of FIG. 2 shows a portion of a hierarchical tree 50 which represents a hierarchy of queues involved in the control of printer production operations. This tree is disposed in a screen region 51. Let us assume that an interactive user needs to get details regarding the attributes of the objects, i.e. the child objects which are members of one of the queues: Queue 1. By the interactive means described above, he selects Queue 1 and gets the screen of FIG. 3 in which the selected Queue 1 is highlighted. As it turns out, the child objects, Printer1 through Printer4 and Job1 through Job4 are of mixed types, which will respectively have different types of attributes. Thus, the detail view of the printer type of child objects are displayed in region 57 of the screen while the detail view of the job type of child objects are displayed in separate region 58 of the screen. It should be noted that the attribute heading 59 for printer objects involves only the name and status, while attribute heading 60 for the job type of objects involved five different attributes. This simple example illustrates how this present invention may be used at a variety of levels of a tree to give detail views where the child objects under a selected parent object are different types. The display of the details in two separate regions, 57 and 58, permits a full exposition of the respective attributes, 59 and 60, of the child objects in a clear and not confusing manner.

Figure 4:
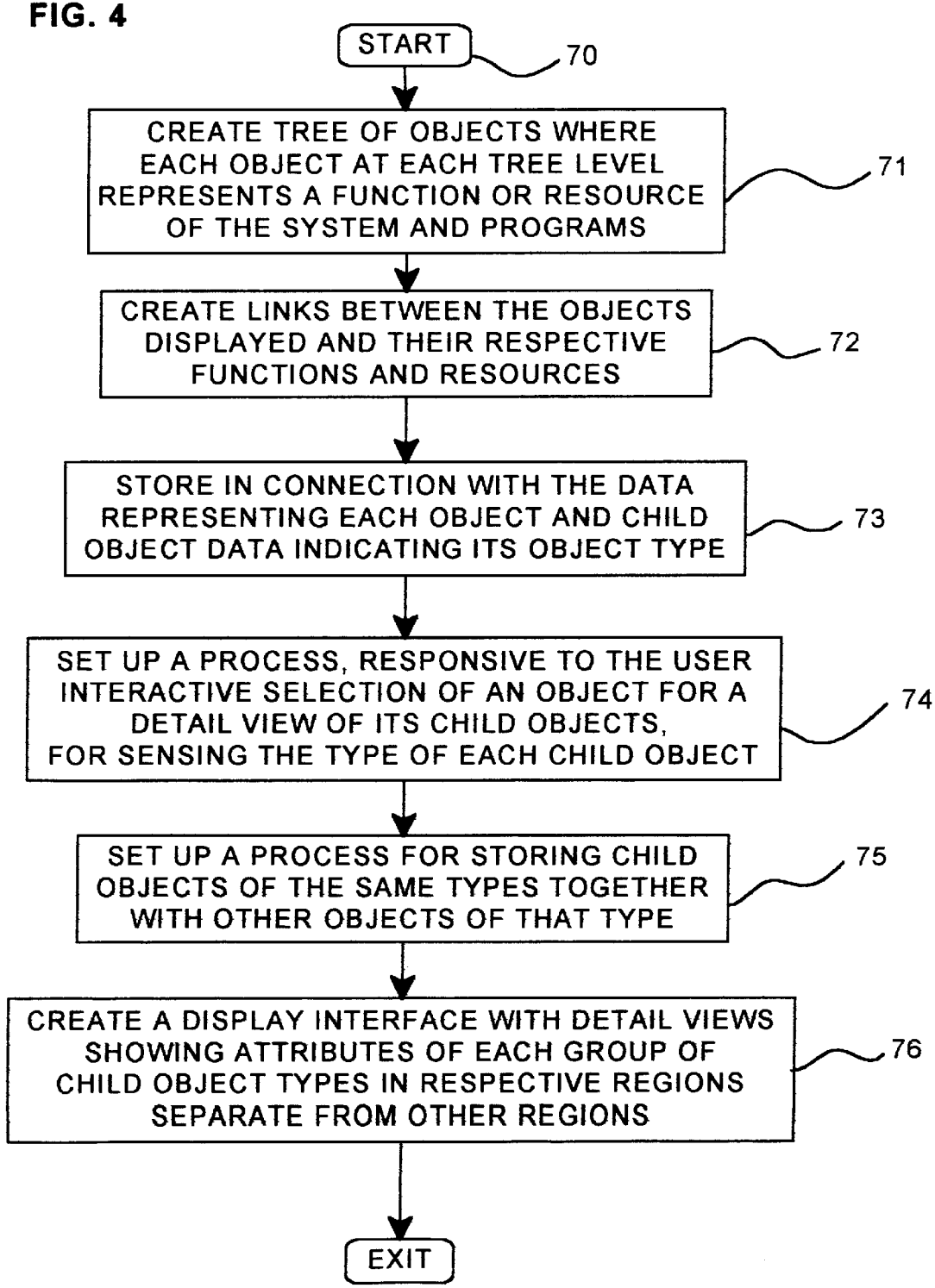
FIG. 4 is a flowchart showing the development of the program of the present invention for displaying the details view of the attributes of different child objects respectively in separate screen regions.

Now, with reference to FIG. 4, we will describe a process implemented by a program according to the present invention. The program is continuous and involves the development of the display screen interfaces previously described with respect to FIGS. 2 and 3. In the flowchart of FIG. 4, a basic window interface is set up, step 71, whereby the operator may control printer functions through a series of queues arranged in a hierarchical tree, e.g. an interface like that of FIG. 3. Of course, appropriate conventional linkages are set up between representations of functions displayed on a screen whether these representations be text or icons representative of the functions and the functions themselves, step 72. There is stored in connection with the data for each object and child object, some indication of the object type, step 73. Then a process is set up responsive to the selection of a particular object for its child objects' detail views for determining the object types of each of the child objects, step 74. A process is provided for storing together the child objects of a selected parent object which are of the same type, step 75, so that, step 76, the attribute details of such stored groups of child object types may be displayed in separate regions, e.g. regions 57 and 58, FIG. 4.

Figure 5:
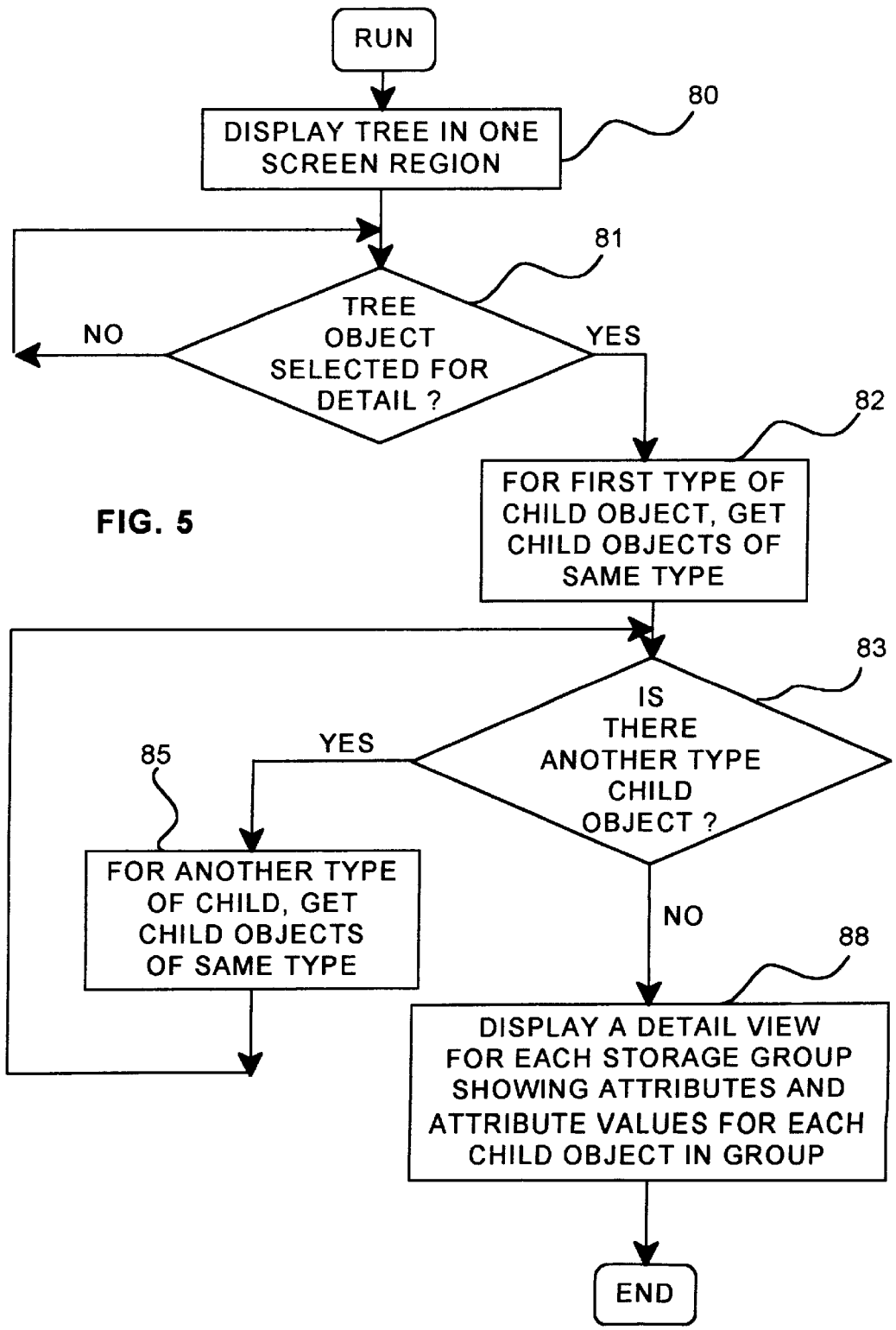
FIG. 5 is a flowchart showing the running of the program described with respect to FIG. 4.

Now that the basic program has been described and illustrated, there will be described with respect to FIG. 5, a flow of a simple operation showing how the program could be run. First, step 80, the tree display of FIG. 2 is set up. Next, an initial determination is made as to whether an object in the tree has been selected for detail view of its child objects, step 81. If No, the flow is returned to decision step 81 and the wait for a selection is continued. If there is a selection of a particular object, then, step 82, all of the child objects of the selected parent object that are of a first type are obtained. A determination is made as to whether there is another type of child object within the selected object. In the present case, there would be another type. The process would proceed to step 85 and all of the child objects of this other type would be gotten. The process is then branched back to step 83 where a determination is again made as to whether there are any further types of child objects. For the present example, assume that there are no further types. Then, decision from step 83 is No. At that point, step 88, the details view for each stored group having the objects of a given attribute type are displayed in a separate region as shown in FIG. 3.

While the embodiment described has been for a hierarchical tree used in the control of resources in a printing environment, it should be understood that the invention is applicable in any data processing environment or data processor controlled system in which hierarchical trees may be used. This includes all current windows system such as Windows 95™, Windows NT™, OS/2™, as well as Unix and AIX based systems. In general, trees are now used in all areas where resources are managed, e.g. production control, database management and management of data processing resources including parallel processing, directories, files, etc., and the present invention may be advantageously used in all such areas.

In addition, it has been mentioned hereinabove that the present invention may be advantageously used in object oriented programming systems where hierarchical trees are extensively used. By way of background with respect to object oriented programming, its techniques involve the definition, creation, use and construction of "objects". These objects, as mentioned above, are not to be confused with the displayed objects or elements in trees. These programming objects are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements, and its behavior, which can be represented by its methods. Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments, provided during object creation, to construct the object. A significant property of object oriented programming is inheritance, which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form. The creation of a new subclass borrowing the functionality of another class allows software developers to easily customize existing code to meet their particular needs.

In order to help object oriented program developers construct programs, particularly when inheritance is involved, object oriented programming systems make extensive use of hierarchical trees in order to help the interactive programmers and users in the understanding of the basic structures of classes and subclasses, as well as the parent objects in classes and their child objects in the various types of subclasses inheriting some of their property classes above them in the hierarchy. It is to the detailing of such relationships between parent and child objects in object oriented hierarchies that the present invention may be applied. The present invention would be applicable to the detail views involving parent objects of which the child objects inherit many but not all of the parent class attributes and, thus, are in different types of subclasses. It is also applicable to trees in which a selected parent object is of a container class which, as mentioned previously, may contain objects without any inheritance relationship.

Although certain preferred embodiments have been shown and described, it will be understood that many changes and modifications may be made therein without departing from the scope and intent of the appended claims.

What is claimed is:

1. A data processor controlled user interactive display interface comprising:

a tree view of selectable elements arranged in a hierarchy in one region of a display interface screen, at least one of said selectable elements having a plurality of different types of child elements, and means responsive to the selection of an element having child elements of different types for displaying attributes of said child elements in a plurality of separate screen regions, each screen region respectively containing the attributes of one of said different types of elements, wherein each different type of child element has different displayed attributes.

2. The display interface of claim 1, wherein said plurality of different child elements are at different hierarchical levels.

3. The display interface of claim 1, wherein, said elements are parent objects, and said different types of child elements are child objects respectively of types in subclasses inheriting some attributes of the class of the selected parent object type.

4. The display interface of claim 1, wherein the selected element is a member of a container class.

5. The display interface of claim 3 wherein said selectable parent objects in said tree view hierarchy includes at least one object of a container class and at least one object having different types of child objects in subclasses inheriting the attributes of the class of said selected object type.

6. The display interface of claim 1 wherein said interface is for the interactive control of production operations.

7. The display interface of claim 6 wherein said production operations are printing operations.

8. A method for interactively interfacing with a data processor controlled displayed comprising:

providing a tree view of selectable elements arranged in a hierarchy in one region of a display interface screen, at least one of said selectable elements having a plurality of different types of child elements, and selecting an element having child elements of different types, and displaying attributes of the child elements of said child elements in a plurality of separate screen regions, each screen region respectively containing the attributes of one of said different types of elements, wherein each different type of child element has different displayed attributes.

9. The method of claim 8, wherein said plurality of different child elements are at different hierarchical levels.

10. The method of claim 8, wherein, said elements are parent objects, and said different types of child elements are child objects respectively of types in subclasses inheriting the attributes of the class of said selected object type.

11. The method of claim 8, wherein the selected element is a member of a container class.

12. The method of claim 10 wherein said selectable parent objects in said tree view hierarchy include at least one object of a container class and at least one object having different types of child objects in subclasses inheriting the attributes of the class of said selected object type.

13. The method of claim 8 wherein said method is for the interactive control of production operations.

14. The method of claim 13 wherein said production operations are printing operations.

15. A computer controlled display program having program code included on a computer readable medium for a user interactive interface to a computer controlled display comprising:

a tree view of selectable elements arranged in a hierarchy in one region of a display interface screen, at least one of said selectable elements having a plurality of different types of child elements, and means responsive to the selection of an element having child elements of different types for displaying attributes of said child elements in a plurality of separate screen regions, each screen region respectively containing the attributes of one of said different types of elements, wherein each different type of child element has different displayed attributes.

16. The computer controlled display program of claim 15, wherein said plurality of different child elements are at different hierarchical levels.

17. The computer controlled display program of claim 15, wherein, said elements are parent objects, and said different types of child elements are child objects respectively of types in subclasses inheriting some attributes of the class of the selected parent object type.

18. The computer controlled display program of claim 15, wherein the selected element is a member of a container class.

19. The computer controlled display program of claim 17 wherein said selectable parent objects in said tree view hierarchy include at least one object of a container class and at least one object having different types of child objects in subclasses inheriting the attributes of the class of said selected object type.

20. The computer controlled display program of claim 15 wherein said interface is for the interactive control of production operations.

21. The computer controlled display program of claim 20 wherein said production operations are printing operations.

22. A data processor controlled user interactive display interface for controlling printers in a print shop operation comprising:

a tree view of selectable elements arranged in a hierarchy in one region of a display interface screen, at least one of said selectable elements having a plurality of different types of child elements, and means responsive to the selection of an element having child elements of different types for displaying attributes of said child elements in a plurality of separate screen regions, each screen region respectively containing the attributes of one of said different types of elements, wherein each different type of child element has different displayed attributes.

* * * * *